UNITED STATES PATENT OFFICE 2,164,787

DI(AMINO-AROYL) ALKYLENE DIAMINES

Swanie Siguard Rossander, Wilmington, Del., and Carlton Webster Croco, Woodstown, N. J., assignors to E. I. du Pont de Nemours & Company, Wilmington, Del., a corporation of Delaware No Drawing. Continuation of application Serial No. 161,039, August 26, 1937. This application July 28, 1938, Serial No. 221,718

8 Claims. (Cl. 260—558)

This invention relates to new azo dye intermediates. More particularly, this invention relates to new azo dye intermediates of the general formula

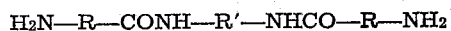

H₂N—R—CONH—R'—NHCO—R—NH₂ wherein R is a bivalent aromatic radical of the group consisting of the benzene and naphthalene series of compounds, R' is a bivalent saturated hydrocarbon radical (a saturated aliphatic or cycloaliphatic radical), and the position of NH₂ on R relative to CONH is selected from the group consisting of meta and para. As typical compounds of the above general formula may be mentioned N,N'-di-(p-amino-benzoyl)-ethylene-diamine
N,N'-di-(m-amino-benzoyl)-decylene-diamine and
N,N'-di-(p-amino-benzoyl)-1,4-cyclohexene-diamine This application is a continuation of our copending application Serial No. 161,039 filed August 26, 1937.

It is an object of this invention to provide new azo dye intermediates. A further object is to provide a new type of azo dye intermediate, containing two primary amino groups, both of which can be diazotized and coupled with suitable coupling components to produce new and valuable azo dyes. Further objects will appear hereinafter.

These objects of our invention may be accomplished by condensing 2 moles of a meta- or para- nitro-aroyl halide, for instance p-nitrobenzoyl chloride, with one mole of a diamine of a saturated hydrocarbon, and then reducing the resulting di-nitroaroyl)-diamino compound to the diamino stage. As the diamine of a saturated hydrocarbon in this reaction may be selected the diamine of any pariffin hydrocarbon containing from 2 to 20 carbon atoms, whether in a straight chain or branched chain. Or the diamine of a cycloaliphatic hydrocarbon may be selected, for instance the 1,4-diamine of cyclohexane, methyl-cyclohexane or decahydronaphthalene.

The condensation may follow the general mode of procedure in such reactions; for instance, by bringing the reactants together in aqueous medium in the presence of an acid absorbing agent, such as sodium carbonate or acetate. The reduction of the dinitro compounds may likewise follow standard procedure; for instance it may be effected by catalytic hydrogenation or by reducing with iron and acid, zinc and acid, or sodium sulfide in alkaline solution.

It is pointed out that the NH₂ group may not occupy a position on the aromatic radical ortho to the CONH group. The ortho amino compounds are not useful for the preparation of azo dyes because, when diazotized, the ortho amino compounds undergo ring closure to form compounds which cannot be used as dye intermediates. For example, o,o'-di(aminobenzoyl)-ethelene-diamine having the formula

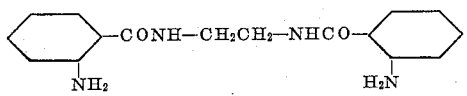

when diazotized immediately reacts with itself to form

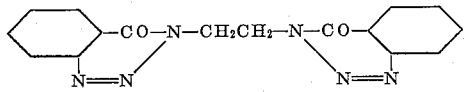

which compound is worthless as a dye intermediate. The new azo dye intermediates of the present invention must have the NH₂ groups in a position on the aromatic radical meta or para to the CONH group.

The ultimate diamino compounds thus produced all have the common property of being capable of tetrazotization and coupling to produce disazo dyes, which, depending on the choice of coupling component, may in certain cases be further developed on the fiber. Certain members of our novel series have the further valuable qualities of giving exceptionally bright shades of color, and developing into dyes which can be discharged to a clear white background. This property is particularly outstanding in the case of the meta and para diamino-dibenzoyl derivatives from ethylene diamine, to which the following general formula may be ascribed

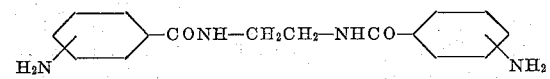

wherein the NH₂ group is meta or para to the CONH group.

Without limiting our invention to any particular procedure, the following examples will illustrate our preferred mode of operation. Parts mentioned are by weight.

*Example 1.—Synthesis of the dinitro compound*

Heat 2000 parts of water to 60° C. in a reaction vessel. Add 60 parts of ethylene diamine and 340 parts of sodium acetate crystals, followed by stirring until the sodium acetate is completely dissolved (approximately 15 minutes). Slowly add 232 parts of 4-nitro-benzoyl chloride (as a 20% solution in carbon tetrachloride) over a period of about 1 hour, maintaining a temperature of 55 to 60° C. During the next hour, slowly add 232 more parts of 4-nitro-benzoyl-chloride as above, with frequent addition of soda ash as necessary to keep the charge faintly alkaline to brilliant yellow paper (a spot of the reaction mixture should turn the yellow paper to a faint red color). Stir 15 minutes after the 4-nitro-benzoyl chloride is added. Add soda ash until the reaction mass shows a bright red when spotted on brilliant yellow paper. Slowly heat the mass to 90° C. and hold for one-half hour, maintaining red alkalinity on brilliant yellow paper by the addition of more soda ash if necessary. Cool the reaction mixture to 30° C. and filter. Wash the press cake thus obtained with three 300 part portions of cold water. Transfer the wet press cake to an oven and dry at 90 to 110° C.

The product, which is obtained in good yield, is a yellow, crystalline product, and constitutes di(p-nitrobenzoyl)-ethylene diamine most probably of the formula

Example 2.—Formation of the diamino compound

Charge 75 parts of the dried product obtained in Example 1 and 230 parts of methyl alcohol into a mixing vessel provided with an agitator. Suck the suspension into a high pressure autoclave together with seven parts of nickel catalyst. Evacuate the autoclave and sweep out the residual air by a stream of hydrogen. Pump in hydrogen to a pressure of 500 lbs. per square inch. Start agitating and heat the oil in the jacket to 100 to 110° C., bringing the temperature of the charge to 100° C. At this point increase the hydrogen pressure to 1000 lbs. and continue feeding in hydrogen until no more hydrogen is being absorbed as indicated by a constant pressure reading. Keep a temperature of 95 to 105° C. Now, reduce the pressure to 400 lbs., blow the charge into a tub, cool to 25° C., and filter. Transfer the residue to an agitated vessel containing 700 parts of water at 25 to 35° C. Add 7½ parts of a clarifying charcoal, for instance "Darco", and approximately 15 parts of hydrochloric acid (on the HCl basis) until the reaction mixture shows a blue color when spotted on Congo red paper. Stir the mixture for one-half hour at 25 to 35° C., adding more hydrochloric acid, if necessary, to maintain strong acidity on Congo red paper. Filter, and wash the press cake thus obtained with 300 parts of 3% hydrochloric acid solution. Transfer the filtrate to a vessel provided with good agitation, and add slowly about 25.5 parts of ammonia as a 27% solution, until the solution, when spotted on phenolphthalein paper, turns the latter to a strong red color. Stir for one half hour at 25 to 35° C., maintaining red phenolphthalein alkalinity, as necessary, by the addition of more of the ammoniacal solution. Filter and wash the press cake, thus obtained, with three 300 portions of water. Transfer the wet press cake to an oven and dry at 90 to 110° C. The dried product, p,p'-di(aminobenzoyl)-ethylene-diamine, is a white solid which shows a melting point of 274° C.±1° C. The probable formula of the product is

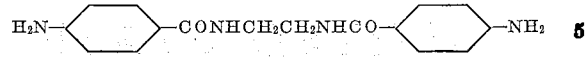

It is quite insoluble in cold water, but dissolves very readily in a dilute solution of hydrochloric acid.

Example 3.—The procedure is the same as in Example 1, except that in lieu of 60 parts of ethylene diamine, 172 parts of 1,10-decylene diamine are employed.

Symmetrical p,p'-di(nitrobenzoyl)-1,10-decylene-diamine is a pale yellow solid.

When reduced according to the method of Example 2, it gives symmetrical p,p'-di(aminobenzoyl)-1,10-decylene-diamine, which is a white, crystalline solid, melting at about 192° C.

Example 4.—The procedure is the same as in Example 1, except that the 60 parts of ethylene diamine are replaced by 114 parts of 1,4-diamino-cyclohexane.

Symmetrical p,p'-di(nitrobenzoyl)-1,4-cyclohexene-diamine is obtained in the form of a yellow solid.

When reduced according to the method of Example 2, it gives symmetrical p,p'-di(aminobenzoyl)-1,4-cyclohexene-diamine, which is a white crystalline solid.

Example 5.—Di-(para-nitro-benzoyl)-hexamethylene diamine

Heat 2000 parts of water to 60 to 80° C. in a reaction vessel. Add 116 parts of 1,6-hexa-methylene-diamine. Slowly add 212 parts of para-nitro-benzoyl-chloride (solid) over a period of about 1½ hours, maintaining the temperature of 60° to 80° C. During the next 1½ hours, slowly add an additional 212 parts of para-nitro-benzoyl-chloride as above, with frequent addition of soda ash as necessary to keep the charge alkaline to Congo red (when a spot of the reaction mixture turns Congo red paper blue, add soda ash until it does not turn blue.) Stir for 1 hour after the 4-nitro-benzoyl-chloride is added. Then add soda ash until the reaction mass shows a bright red when spotted on brilliant yellow paper. Heat the mass to 90° C. Filter and wash the press cake thus obtained with hot water until the wash water is not alkaline to brilliant yellow paper. Dry the press cake at 90 to 110° C.

The product, which is obtained in good yield, is a pale yellow crystalline product with a melting point of 189±1° C. and constitutes most probably symmetrical N,N'-di-(para-nitro-benzoyl)-hexamethylene diamine. The probable formula of the product is

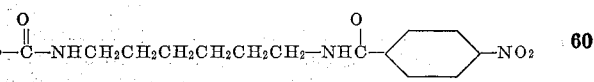

Example 6.—Reduction of the product of Example 5

The product of Example 5 when reduced, isolated, and dried according to the method of Example 2, using the same molal quantities, gives symmetrical N,N'-di-(para-amino-benzoyl)-hexa-methylene diamine, which is a white crystalline solid. This solid has a melting point of 201 to 203° C. It is quite insoluble in water, but readily dissolves in dilute hydrochloric acid solution.

If in lieu of 60 parts of ethylene diamine in Example 1, one uses 74 parts of 1,2-propylene diamine, followed by the rest of the procedure as in Examples 1 and 2, using analogous molecular quantities, one obtains successively N,N'-di-(para-nitro-benzoyl)-1,2-propylene diamine and the corresponding diamino compound.

In a similar manner the di(nitroaroyl) and di(aminoaroyl) derivatives of other diamines of saturated hydrocarbons may be obtained, replacing in each case the 60 parts of ethylene diamine employed in Example 1 by the molal equivalent of the selected diamine of the general formula $H_2N—R'—NH_2$, wherein R' stands for a divalent alkane radical, whether straight chained or branched, or for a divalent cycloaliphatic radical.

By replacing the p-nitrobenzoyl chloride of Example 1 by an equal weight of m-nitrobenzoyl chloride and continuing with the procedures of Examples 1 and 2, the corresponding symmetrical m,m'-dinitro- and m,m'-diamino-dibenzoyl derivatives may be obtained. By replacing the nitro-benzoyl chloride by an equivalent weight of another nitroaroyl chloride, for instance a nuclear substitution derivative of nitrobenzoyl chloride or a nitronaphthoyl chloride, the corresponding dinitroaroyl, and eventually diaminoaroyl, compound may be obtained.

The following is a list of some of the compounds actually prepared by us, together with their physical properties.

| | Dinitro compounds | Melting point |
|---|---|---|
| | | ° C. |
| 1 | Di (para-nitro benzoyl)-ethylene diamine | 250-265 |
| 2 | Di (para-nitro-benzoyl)-decamethylene-diamine | 147-149 |
| 3 | Di (para-nitro-benzoyl)-1:4-cyclohexene-diamine | |
| 4 | Di (meta-nitro-benzoyl)-ethylene-diamine | |
| 5 | Di (4-methoxy-3-nitro-benzoyl)-ethylene-diamine | |
| 6 | Di (meta-nitro-benzoyl)-decamethylene-diamine | |
| 7 | Di (para-nitro-benzoyl)-hexamethylene-diamine | 188-190 |

| | Diamino compounds | Melting point |
|---|---|---|
| | | ° C. |
| 1-A | Di (para-amino-benzoyl)-ethylene-diamine | 274±1 |
| 2-A | Di (para-amino-benzoyl)-decamethylene-diamine | 192 |
| 3-A | Di (para-amino-benzoyl)-1:4-cyclohexene-diamine | |
| 4-A | Di (meta-amino-benzoyl)-ethylene-diamine | 210 |
| 5-A | Di (4-methoxy-3-amino-benzoyl)-ethylene-diamine | 135-6 |
| 6-A | Di (meta-amino-benzoyl)-decamethylene-diamine | 118-120 |
| 7-A | Di (para-amino-benzoyl)-hexamethylene-diamine | 201-203 |

In any of the above cases, the nitroaroyl chloride may be replaced by any other nitro-aroyl halide, for instance the bromide or iodide. The nitro group may occupy either of the positions meta and para with respect to the carbonyl halide group. Beside the nitro group, the nitroaroyl halide may carry other inert substituents which have no tendency to react with amino groups in the presence of alkaline condensing agents. Alkyl, alkoxy and halogen, are types of substituents which will satisfy this condition.

The reacting conditions, such as temperature, concentration and pH value maintained during the condensation, may be subjected to wide variation and modification, as will be readily apparent to those skilled in the art.

The reduction of the condensation products is likewise susceptible of wide variation in the procedure employed and in the conditions maintained, within the skill of those engaged in this art.

We claim:

1. As a new azo dye intermediate, a compound of the formula $$H_2N—R—CONH—R'—NHCO—R—NH_2$$

wherein R is a bivalent aromatic radical of the group consisting of the benzene and naphthalene series of compounds, R' is a bivalent saturated non-aromatic hydrocarbon radical, and the position of $NH_2$ on R relative to CONH is selected from the group consisting of meta and para.

2. As a new azo dye intermediate, a compound of the formula $$H_2N—R—CONH—R'—NHCO—R—NH_2$$

wherein R is a bivalent aromatic radical of the group consisting of the benzene and naphthalene series of compounds, R' is a bivalent paraffin hydrocarbon radical and the position of $NH_2$ on R relative to CONH is selected from the group consisting of meta and para.

3. As a new azo dye intermediate, a compound of the formula $$H_2N—R—CONH—(CH_2)_n—NHCO—R—NH_2$$

wherein R is a bivalent aromatic radical of the benzene series of compounds, n is an integer selected from the group consisting of 2 to 20 inclusive, and the position of $NH_2$ on R relative to CONH is selected from the group consisting of meta and para.

4. As a new azo dye intermediate, a compound of the formula

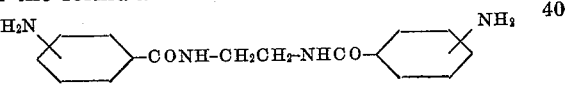

wherein the position of $NH_2$ on the benzene nuclei relative to CONH is selected from the group consisting of meta and para.

5. As a new azo dye intermediate, p,p'-di-(amino-benzoyl)-ethylene-diamine, a white solid having a melting point of about 274° C.

6. As a new azo dye intermediate, m,m'-di-(amino-benzoyl)-ethylene-diamine, a white solid having a melting point of about 210° C.

7. As a new azo dye intermediate, a compound of the formula $$H_2N—R—CONH—R'—NHCO—R—NH_2$$

wherein R is a bivalent aromatic radical of the group consisting of the benzene and naphthalene series of compounds, R' is a bivalent radical of a cycloaliphatic hydrocarbon, and the position of $NH_2$ on R relative to CONH is selected from the group consisting of meta and para.

8. As a new azo dye intermediate p,p'-di(amino-benzoyl)-1,4-cyclohexene-diamine, a white crystalline solid.

SWANIE SIGUARD ROSSANDER.
CARLTON WEBSTER CROCO.

Certificate of Correction

Patent No. 2,164,787. July 4, 1939.

SWANIE SIGUARD ROSSANDER ET AL.

It is hereby certified that errors appear in the printed specification of the above numbered patent requiring correction as follows: Page 1, first column, line 38, for "di-nitroaroyl)" read *di(nitroaroyl)*; line 41, for "pariffin" read *paraffin*; page 2, second column, line 22, for "1.4-diamino-" read *1,4-diamino-*; line 60, for that portion of the formula reading

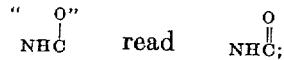

and that the said Letters Patent should be read with these corrections therein that the same may conform to the record of the case in the Patent Office.

Signed and sealed this 12th day of September, A. D. 1939.

[SEAL]

HENRY VAN ARSDALE,
*Acting Commissioner of Patents.*